US010694214B2

United States Patent
Pu et al.

(10) Patent No.: US 10,694,214 B2
(45) Date of Patent: Jun. 23, 2020

(54) MULTI-TYPE PARALLELIZED SAMPLE ADAPTIVE OFFSET IN VIDEO CODING

(71) Applicant: QUALCOMM Incorporated, San Diego, CA (US)

(72) Inventors: Wei Pu, San Diego, CA (US); Jianle Chen, San Diego, CA (US); Krishnakanth Rapaka, San Diego, CA (US); In Suk Chong, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1628 days.

(21) Appl. No.: 14/134,765

(22) Filed: Dec. 19, 2013

(65) Prior Publication Data

US 2014/0177704 A1  Jun. 26, 2014

Related U.S. Application Data

(60) Provisional application No. 61/745,480, filed on Dec. 21, 2012, provisional application No. 61/747,124, filed on Dec. 28, 2012.

(51) Int. Cl.
*H04N 19/132* (2014.01)
*H04N 19/70* (2014.01)
(Continued)

(52) U.S. Cl.
CPC ........... *H04N 19/70* (2014.11); *H04N 19/117* (2014.11); *H04N 19/14* (2014.11); *H04N 19/186* (2014.11);
(Continued)

(58) Field of Classification Search
CPC ....... H04N 19/00127; H04N 19/00533; H04N 19/00315; H04N 19/0026; H04N 19/00066
See application file for complete search history.

(56) References Cited

U.S. PATENT DOCUMENTS 9,386,304 B2 *  7/2016  Bjontegaard ........ H04N 19/10
2012/0177107 A1  7/2012  Fu et al.
(Continued)

OTHER PUBLICATIONS

International Preliminary Report on Patentability from International Application No. PCT/US2013/076955 dated Apr. 8, 2015.
(Continued)

*Primary Examiner* — Shawn S An
(74) *Attorney, Agent, or Firm* — Shumaker & Sieffert, P.A.

(57) ABSTRACT

In general, techniques are described for performing multiple passes of sample adaptive offset (SAO) filtering when coding video data. A video decoding device comprising one or more processors may perform the techniques. The processors may determine a first SAO pixel classification for a block of video data and determine a first offset value based on the first SAO pixel classification and one or more pixel values of the block. The one or more processors may also determine a second SAO pixel classification for the block and determine a second offset value based on the second SAO pixel classification and the one or more pixel values of block of video data. The processors may then apply the first offset value and the second offset value to the block of video data to generate a block of SAO filtered video data.

22 Claims, 8 Drawing Sheets

(51) Int. Cl.
*H04N 19/186* (2014.01)
*H04N 19/86* (2014.01)
*H04N 19/436* (2014.01)
*H04N 19/82* (2014.01)
*H04N 19/194* (2014.01)
*H04N 19/14* (2014.01)
*H04N 19/117* (2014.01)

(52) U.S. Cl.
CPC ......... *H04N 19/194* (2014.11); *H04N 19/436* (2014.11); *H04N 19/82* (2014.11); *H04N 19/86* (2014.11)

(56) References Cited

U.S. PATENT DOCUMENTS

| | | | | |
|---|---|---|---|---|
| 2013/0114682 A1* | 5/2013 | Zhao | ....................... | H04N 19/82 375/240.03 |
| 2013/0177068 A1* | 7/2013 | Minoo | ................. | H04N 19/117 375/240.02 |
| 2013/0336383 A1* | 12/2013 | Xu | ......................... | H04N 19/46 375/240.02 |
| 2014/0269913 A1* | 9/2014 | Lee | ...................... | H04N 19/197 375/240.12 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Fu C-M et al., "Sample adaptive offset for HEVC", Multimedia Signal Processing (MMSP), 2011 IEEE 13th International Workshop on IEEE, Oct. 17, 2011, XP032027547, DOI: 10.1109/MMSP.2011.6093807, 5 pp.
Fu et al., "CE13: Sample adaptive offset with LCU-Idenpendent Decoding," Multimedia Signal Processing (MMSP), 2011 IEEE 13th International Workshop on IEEE, Mar. 16-23, 2011, Document JCTVC-E049, 6 pp.
Segall, et al., "Unifed Deblocking and SAO", JCT-VC Meeting; MPEG Meeting; Nov. 21-30, 2011; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-G608, XP030110592, 6 pp.
Sugimoto, et al., "Parallel processing of ALF and SAO for tiles", MPEG Meeting; Nov. 28-Dec. 2, 2011; Geneva; (Motion Picture Expert Group or ISO/IEC JTC1/SC29/WG11), No. m22018, XP030050581, Document: JCTVC-G454, 4 pp.
U.S. Appl. No. 14/512,177, filed Oct. 10, 2014, by Li, Xiang.
International Search Report and Written Opinion from International Application No. PCT/US2013/076955, filed on May 8, 2014, 13 pp.
Second Written Opinion from International Application No. PCT/US2013/076955, filed on Feb. 16, 2015, 7 pp.

* cited by examiner

SAO_EO_0

SAO_EO_1

SAO_EO_2

SAO_EO_3

FIG. 4

MULTI-TYPE PARALLELIZED SAMPLE ADAPTIVE OFFSET IN VIDEO CODING

This application claims the benefit of U.S. Provisional Application No. 61/745,480 filed Dec. 21, 2012 and U.S. Provisional Application No. 61/747,124 filed Dec. 28, 2012, the entire contents of each of which are hereby incorporated by reference.

TECHNICAL FIELD

This disclosure generally relates to video coding and more particularly to sample adaptive offset (SAO) filtering when performing video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, techniques are described in this disclosure for performing multi-pass SAO filtering. Rather than perform a single pass of SAO filtering, the techniques provide for multiple ways by which two or more SAO filtering passes may be applied to a block of video data. In some instances, the techniques may enable a video coder (which may represent either or both of a video encoder or a video decoder) to perform the two or more passes of SAO filtering sequentially (meaning applying a first SOA filtering pass to the block of video data to generate a block of first pass SAO filtered video data followed by a second SAO filtering pass to the block of first pass SAO filtered video data). In other instances, the techniques may enable the video coder to perform the two or more passes of SAO filtering at least partially in parallel (or, in other words, concurrently), where at least one operation of the second pass of SAO filtering is performed concurrent with performing at least one operation of the first pass of SAO filtering.

Multi-pass SAO filtering may, when the multiple passes are performed in accordance with the techniques either sequentially or concurrently, may improve video coding compression efficiency (in terms of the size of the resulting encoded bit stream compared to single pass SAO filtering) and perceived video quality upon decoding and playback. When performed concurrently in accordance with the techniques described in this disclosure, multi-pass SAO filtering may reduce latency in comparison to sequential multi-pass SAO filtering while generally retaining improved video compression efficiency and perceived video quality.

BRIEF DESCRIPTION OF DRAWINGS

FIG. 4 is a block diagram illustrating an example video encoder that may implement the sample adaptive offset filtering techniques described in this disclosure.

DETAILED DESCRIPTION

Figure 1:
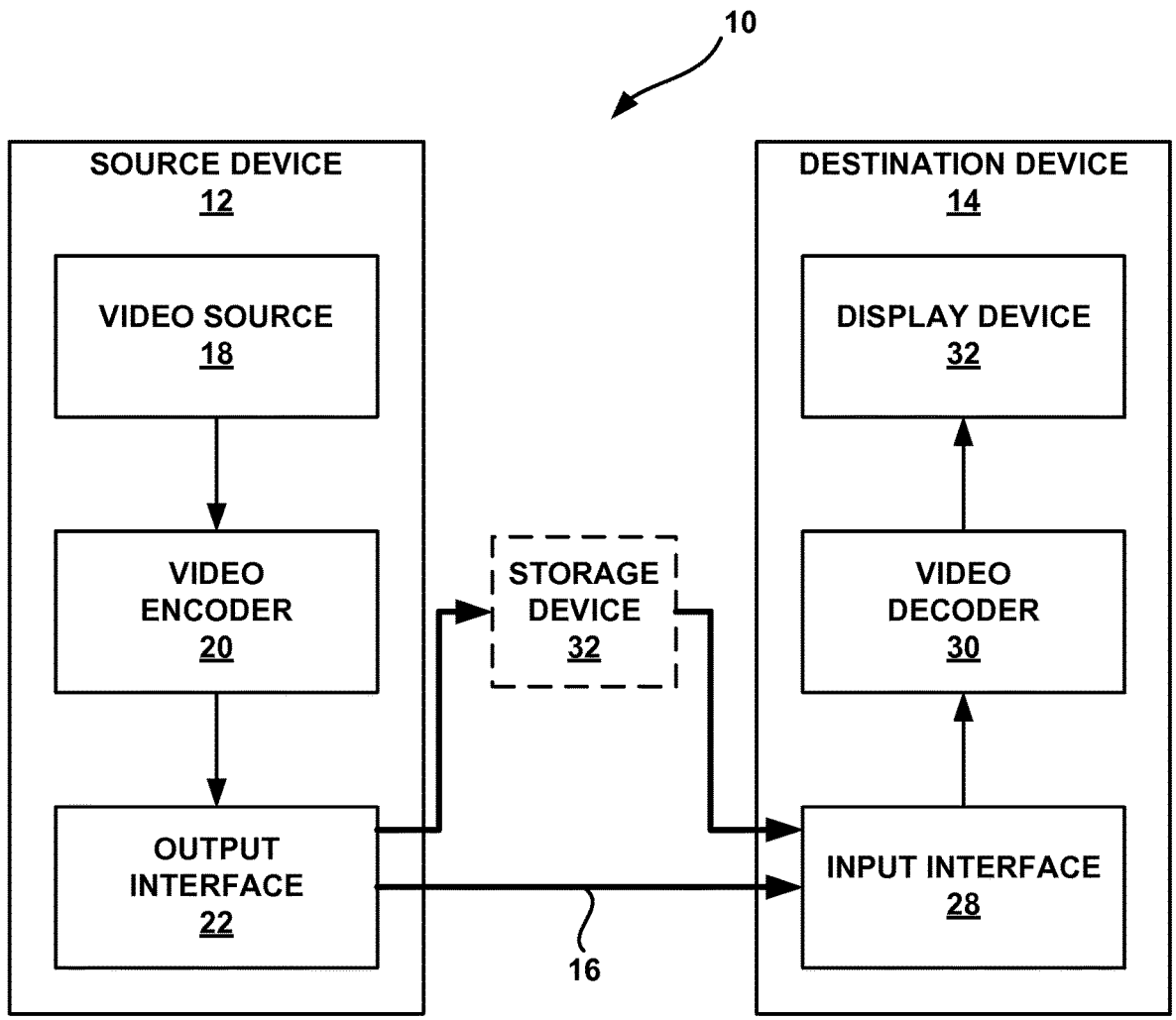
FIG. 1 is a block diagram illustrating an example video encoding and decoding system that may utilize the sample adaptive offset filtering techniques described in this disclosure.

This disclosure describes techniques related to various loop filtering operations that may be performed as part of video coding and potentially various extensions to video coding, such as a range extension that provides for higher pixel value bit-depths and a screen coding extension directed to coding screen content. More particularly, this disclosure describes techniques related to sample adaptive offset (SAO) filtering. SAO filtering is a type of loop filtering used in video coding. In general, the addition of offset values to pixels in a video frame (e.g., a reconstructed image) may in some instances improve coding without greatly increasing the bit overhead needed to store or transmit encoded video data. The improvement in coding that potentially results from SAO filtering may be, for example, that a decoded image more closely resembles an original image. As will be explained in greater detail below, SAO techniques allow for different offset values to be applied to different pixels (or blocks of pixels) depending on pixel (or block) classification metrics, such as edge metrics, band metrics, or other types of metrics.

As explained in greater detail below, in some configurations, an SAO filter unit may be configured to perform two types of offset filtering, generally referred to in this disclosure as band offset filtering and edge offset filtering. An SAO filter unit may also at times apply no offset, which (as explained in more detail below) can itself be considered a third type of offset filtering. The type of offset filtering applied by an SAO filter may be either explicitly or implicitly signaled to a video decoder. When applying edge offset filtering, pixels can be classified based on edge information of a coding unit, and an offset can be determined for pixels based on the edge classification. As will be explained in greater detail below, there are typically four variations of edge-based SAO, where the value of a pixel is compared to two of its eight neighboring pixels. Which two pixels are used for comparison depends on which variation of edge-based offset is used. Based on the magnitude difference, an offset is added to the pixel value.

When applying band offset filtering, pixels can be classified into different bands based on a pixel value, such as an intensity value, with each band having an associated offset. A band includes a range of pixel values. For example, pixel values ranging from 0 to 255 may be divided into 32 equal bands (labeled 0 to 31), such that pixel values 0-7 are a first band, pixel values 8-15 are a second band, pixel values 16-23 are a third band, and so on for all thirty-two bands. The bands can be used for determining which particular offset value to apply to a pixel or group of pixels. For example, if a pixel has a value of 10 (which is within the second band, i.e. values 8-15, in the example above), then an offset associated with the second band can be added to the pixel value. In some current proposals for HEVC, some or most bands may have an associated offset of zero while other bands may have non-zero offsets. For example, in some implementations, only four consecutive bands may have non-zero offsets. Thus, an indication of which four bands have the non-zero offsets and values for the offsets can be signaled in an encoded bitstream, while offsets for all other bands are assumed to be zero.

In some current proposals for HEVC, SAO filtering may be enabled and disabled at the slice level, and furthermore, SAO filtering may be enabled and disabled separately for luma and chroma samples. For example, for a particular slice of video data, both luma and chroma samples may be SAO filtered; neither luma nor chroma samples may be SAO filtered; or one of luma and chroma samples may be SAO filtered while the other is not. When SAO filtering is enabled for a slice, then SAO type and offset values are signaled at an LCU level. As introduced above, the SAO type can include band offset filtering, edge offset filtering, or no SAO filtering. Thus, even if SAO filtering is enabled for a particular slice, some LCUs of that slice may not be SAO filtered (i.e., some LCUs will have an SAO type of no SAO filtering). In some instances, the SAO type and the offset values are signaled with a series of merge flags, where a true value for a first merge flag indicates the offset type and the offset values for the LCU are inherited from a left neighboring LCU and a true value for a second merge flag indicates the SAO type and the offset values are inherited from an above neighboring LCU. If both merge flags are false, then a new SAO type and new offset values are sent for the LCU.

This disclosure introduces two-pass SAO filtering techniques, where a portion of the operations associated with the first pass can be performed in parallel or, in other words, concurrently with portions of the operations of the second pass. By performing portions of the two passes concurrently as opposed to sequentially, encoding and decoding performance may be improved. In some implementations, the two-pass SAO techniques of this disclosure may be applied to a base layer or a non-base layer of video data. In some implementations, however, the two-pass SAO techniques of this disclosure may be only used for non-base layers of video data, while alternate techniques are used for base layers.

FIG. 1 is a block diagram illustrating an example video encoding and decoding system 10 that may utilize the SAO techniques described in this disclosure. System 10 may, for example, be configured to perform multiview video coding, such as 3D video coding or scalable video coding. In addition, system 10 may be configured to perform various other forms of video coding, such as a range extension profile of the High Efficiency Video Coding (HEVC) standard presently under development, or a screen content coding profile of the HEVC standard. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to other video compression standards, including the High Efficiency Video Coding (HEVC) standard presently under development and extensions or additional profiles thereof. A draft of the upcoming HEVC standard, referred to as "HEVC Working Draft 9," or WD9, is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of 28 Dec. 2012, is downloadable from http://phenix.int-evry.fr/jct/doc_end_user/documents/11_hanghai/wg11/JCTVC-K1003-v8.zip. Video encoder 20 and video decoder 30 may operate according to various profiles of HEVC, including a range extension profile described in Flynn et al., "High Efficiency Video Coding (HEVC) Range Extensions text specification: Draft 4," Joint Collaborative Team on Video Coding (JCT-VC) of ITU-T SG 16 WP 3 and ISO/IEC JTC 1/SC 29/WG 11, 13$^{th}$ meeting: Incheon, KR, 18-26 Apr. 2013, which as of Dec. 10, 2013 is downloadable from http://phenix.it-sudparis.eu/jct/doc_end_user/current_document.php?id=8139. Another profile as of yet to be defined according to which video encoder 20 and video decoder 30 may operate is a screen content coding profile of HEVC. the techniques of this disclosure, however, are not limited to any particular coding standard or extension or profile thereof.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of coding tree units (CTUs), also referred to as largest coding units (LCUs), that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, the addition of offset values to pixels in an LCU, other coding unit or picture as a whole may improve coding in some instances. For example, video encoder 20 may apply offset values to pixels of a reconstructed video block in order to compensate for illumination changes, quantization errors, or more generally, to make decoded video data more closely resemble original video data. SAO techniques allow for different offset values to be applied to different pixels (or blocks of pixels) depending on the pixel values of a pixel (or block). Video encoder 20 may perform SOA to apply the offset value to a pixel, where video encoder 20 determines this offset based on the value of a pixel. For example, if a pixel has a value that is within a first band, video encoder 20 may apply an offset associated with the first band to the pixel. If the pixel has a value that is within a second band, video encoder 20 may apply an offset associated with the second band to the pixel, and so on for all bands.

In one type of SAO implementation, each partition (which includes a set of LCUs) can have one of three offset types (also called SAO pixel classifications). The three offset types are no offset, band classification based offset type 0/1, and edge classification based type 0/1/2/3. Each band classification offset type may, for example, have 16 possible offset values, while each edge classification based type may have 4 possible offset values. If one of these offset types is chosen to be used for the partition, video encoder 20 may signal, in the encoded video bitstream, information indicating the corresponding offset type and the offset values for use by video decoder 30.

Typically, video encoder 20 may process a given block, LCU or picture using a single pass of SOA processing. While a single pass may improve a perceived quality of the video data upon playback and facilitate better coding efficiency (in terms of bits used to express the encoded version of the video data compared to non-SAO processed encoded versions of the video data), multiple passes of SAO processing may further improve perceived visual quality and/or coding efficiency. While multiple pass SAO processing may be acceptable in certain coding contexts, in other contexts multi-pass SAO processing may introduce unacceptable amounts of latency and/or hardware requirements (often in the form of large buffers to store the results of the preceding SAO pass).

In accordance with the techniques described in this disclosure, video encoder 20 may be configured to determine a first sample adaptive offset (SAO) pixel classification for a block of video data and determine a first offset value based on the first SAO pixel classification and based on one or more pixel values of the block of video data. In some examples, this block of video data may represent a largest coding unit (LCU). In other examples, this block may comprise one block of a larger picture that video encoder 20 is currently processing as a whole to apply multi-pass SAO to the entire picture. In other words, the techniques may be performed by video encoder 20 to apply multi-pass SAO processing with respect to a single block (e.g., an LCU) or an entire picture. Video encoder 20 may then apply the first offset value to the block of video data to determine a second block of video data. This second block of video data may effectively represent a block of first pass SAO filtered video data.

In some instances, video encoder 20 may determine a second SAO pixel classification for the second block of video data. Because video encoder 20 has to wait for the first pass of SAO filtering to finish so as to gain access to this second block (or, in other words, block of first pass SAO filtered video data), this aspect of the techniques may be referred to as sequential multi-pass SAO filtering. Sequential multi-pass SAO filtering may introduce latency and require an increase in conventional buffer sizes to support the sequential nature of this aspect of the techniques.

In some instances, video encoder 20 may be configured to perform parallel multi-pass SAO filtering in accordance with various aspects of the techniques described in this disclosure. When performing multi-pass SAO filtering, rather than wait for the first pass of SAO filtering to be completed, video encoder 20 may determine a second offset value based on the second SAO pixel classification based on one or more pixel values of the original (non-SAO filtered) block of video data. Parallel multi-pass SAO filtering may reduce latency and/or buffer size requirements in certain instances relative to sequential multi-pass SAO filtering. In any event, video encoder 20 may further be configured to apply the second offset value to the second block of video data to generate a block of SAO filtered video data. Video encoder 20 may, as described above, then signal syntax elements or other information in the encoded video bitstream identifying how many passes of SAO filtering was performed and whether the SAO processing was performed sequentially (meaning that each pass is performed before the other is started or in parallel, or, in other terms, concurrently). These syntax elements may accompany the other syntax elements or other information that specifies the SAO offset and type.

Video decoder 30 may be configured to operate in a manner similar to video encoder 20 when performing multi-pass SAO filtering in accordance with the techniques described in this disclosure. Video decoder 30 may be configured to, when performing multi-pass SAO filtering, determine a first sample adaptive offset (SAO) pixel classification for a block of video data. Video decoder 30 may further be configured to determine a first offset value based on the first SAO pixel classification and based on one or more pixel values of the block of video data, as described in more detail below. Video decoder 30 may also be configure to determine a second SAO pixel classification for the block of video data. That is, video decoder 30 may determine the second SAO pixel classification with respect to the original block of video data (meaning, in this instance, a block of video data that has not undergone SAO filtering prior to determining the second SAO pixel classification).

Video decoder 30 may then determine a second offset value based on the second SAO pixel classification and based on the one or more pixel values of block of video data. Video decoder 30 may then apply the first offset value and the second offset value to the block of video data to generate a block of SAO filtered video data.

In this way, the techniques described in this disclosure may enable video encoder 20 and/or video decoder 30 (with each of which or both may be referred to generally as a "video coder") to perform multi-pass SAO filtering. Rather than perform a single pass of SAO filtering, the techniques provide for multiple ways by which two or more SAO filtering passes may be applied to a block of video data. In some instances, the techniques may enable the video coder to perform the two or more passes of SAO filtering sequentially (meaning applying a first SOA filtering pass to the block of video data to generate a block of first pass SAO filtered video data followed by a second SAO filtering pass to the block of first pass SAO filtered video data). In other instances, the techniques may enable the video coder to perform the two or more passes of SAO filtering at least partially in parallel (or, in other words, concurrently), where at least one operation of the second pass of SAO filtering is performed concurrent with performing at least one operation of the first pass of SAO filtering.

Multi-pass SAO filtering may, when the multiple passes are performed in accordance with the techniques either sequentially or concurrently, may improve video coding compression efficiency (in terms of the size of the resulting encoded bit stream compared to single pass SAO filtering) and perceived video quality upon decoding and playback. When performed concurrently in accordance with the techniques described in this disclosure, multi-pass SAO filtering may reduce latency in comparison to sequential multi-pass SAO filtering while generally retaining improved video compression efficiency and perceived video quality.

Figure 2:
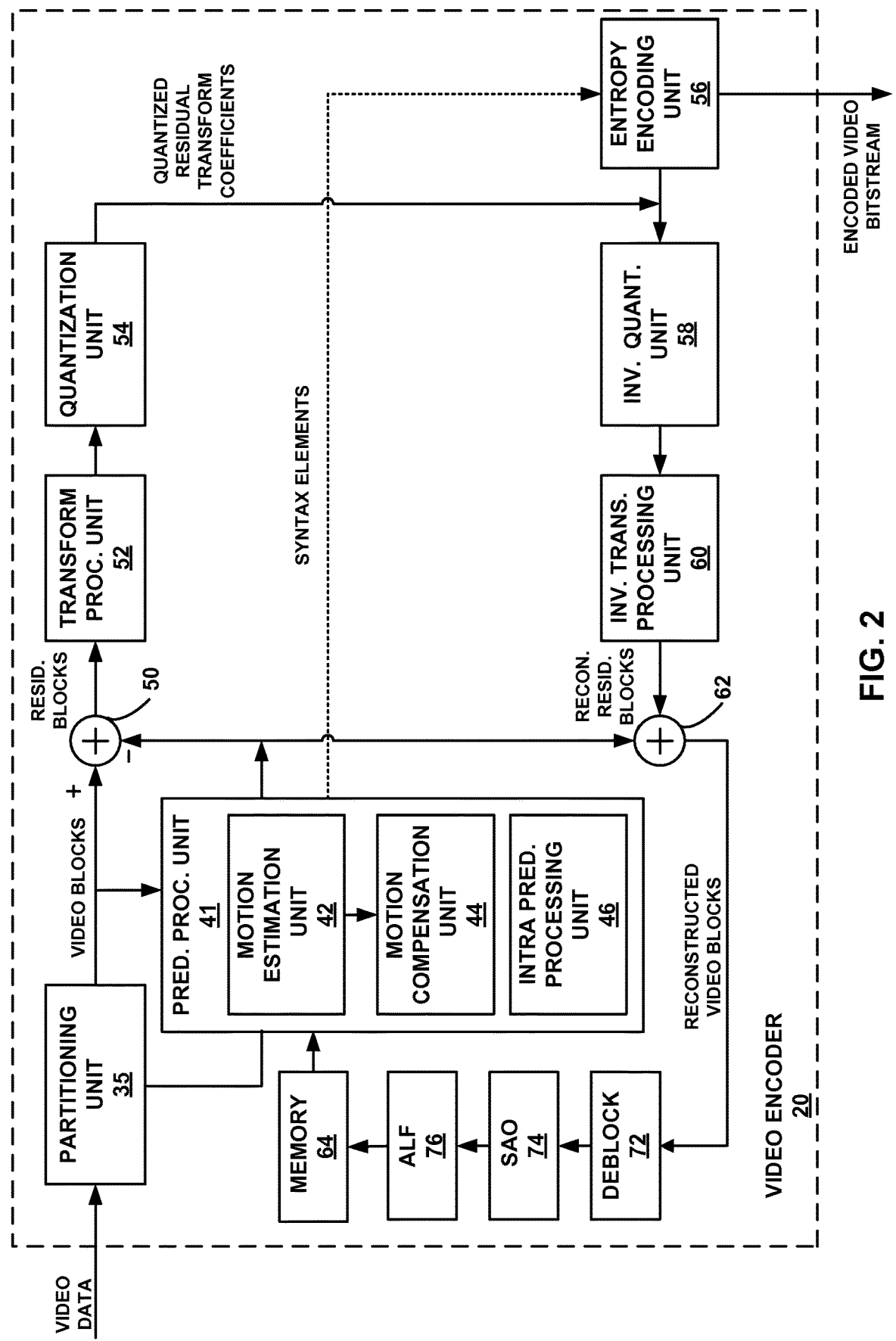
FIG. 2 is an illustration showing examples of edge offset classifications for edge-based sample adaptive offset filtering.

FIG. 2 is a block diagram illustrating an example video encoder 20 that may implement the SAO signaling techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Deblocking filter 72 may also be included to filter block boundaries to remove blockiness artifacts from reconstructed video. As shown in FIG. 2, video encoder 20 also includes additional loop filters, including SAO filter 74 and adaptive loop filter (ALF) 76. Although deblocking filter 72, SAO filter 74, and ALF 76 are shown as being in-loop filters in FIG. 2, in some configurations deblocking filter 72, SAO filter 74, and ALF 76 may be implemented as post-loop filters. Additionally, one or more of deblocking filter 72 and ALF 76 may be omitted in some implementations of the techniques of this disclosure.

In the example of FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, which may include a partition size, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as predicted slices (P slices), bi-direction predicted slices (B slices), or generalized P/B slices (GPB slices). Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may perform intra-prediction on a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and prediction processing unit 41 may select an appropriate intra-prediction or inter-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, un-encoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, prediction processing unit 41 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64.

Prior to storage in memory 64, the reconstructed residual block can be filtered by one or more filters. If desired, deblocking filter 72 may also be applied to filter the reconstructed residual blocks in order to remove blockiness artifacts. Other loop filters (either in the coding loop or after the coding loop) may also be used to smooth pixel transitions, or otherwise improve the video quality. One example of these other filter is SAO filter 74. The reference block may be used by motion estimation unit 42 and motion compensation unit 44 as a reference block to inter-predict a block in a subsequent video frame or picture.

SAO filter 74 can determine offset values for SAO filtering in a manner that improves video coding quality. Improving video coding quality may, for example, involve determining offset values that make a reconstructed image more closely match an original image. Video encoder 20 may, for example, code the video data using multiple passes with different offset values and choose, for inclusion in an encoded bitstream, the offset values that offer a desirable coding quality, as determined based on a rate-distortion calculation, for example.

In some configurations, SAO filter 74 may be configured to apply two types of offset (e.g., band offset and edge offset) as described below in more detail. SAO filter 74 may also at times apply no offset, which can itself be considered a third type of offset. The type of offset applied by SAO filter 74 may be either explicitly or implicitly signaled to a video decoder. When applying edge offset, pixels can be classified based on edge information as described below with respect to the example of FIG. 4 and a filter can be determined based on the edge classification. When applying band offset, SAO filter 74 can classify pixels into different bands based on a pixel value, such as an intensity value, with each band having an associated offset, e.g., as described below in more detail with respect to the example of FIG. 5.

SAO filter 74 may represent hardware or a combination of hardware and software configured to determine a first sample adaptive offset (SAO) pixel classification for a block of video data. As noted above, the block of video data may comprise one or more of a block of luma samples or a block of chroma samples. SAO filter 74 may then determine a first offset value based on the first SAO pixel classification and based on one or more pixel values of the block of video data. SAO filter 74 may apply the first offset value to the block of video data to determine a second block of video data.

SAO filter 74 may also determine a second SAO pixel classification for the block of video data. In some examples, SAO filter 74 may, when determining the first SAO pixel classification, determine the first offset value concurrent with at least one of determining the second SAO pixel classification and determining the second offset value. In some examples, SAO filter 74 may, when determining the second SAO pixel classification, determine the second SAO pixel classification prior to applying the first offset value to the block of video data. In some examples, SAO filter 74 may, when determining the second SAO pixel classification, determine the second SAO pixel classification prior to determining the first offset.

SAO filter 74 may additionally determine a second offset value based on the second SAO pixel classification and based on one or more pixel values of the second block of video data. In some instances, SAO filter 74 may, when determining the first SAO pixel classification for the block of video data, determine the first SAO pixel classification for the block of video data concurrent with at least one of determining the second SAO pixel classification and determining the second offset value. In some examples, SAO filter 74 may, when determining the second offset, determine the second offset prior to applying the first offset value to the block of video data. SAO filter 74 may then apply the second offset value to the second block of video data to generate a block of SAO filtered video data.

SAO filter 74 may also generate syntax elements, which are passed to entropy coding unit 56 to be encoded and specified in the encoded video bitstream. SAO filter 74 may, in some instances, generate one or more syntax element indicating multi-pass parallel SAO filtering was performed. In some instances, SAO filter 74 may generate one or more syntax elements indicating multi-pass sequential SAO filtering was performed. In some instances, SAO filter 74 may generate one or more syntax elements indicating that multi-pass SAO filtering was performed, and generate one or more syntax elements indicating that one or more passes of the multi-pass SAO filtering was performed sequentially and one or more passes of the multi-pass SAO filtering was performed concurrently.

As noted above, video encoder 20 may operate in accordance with a range extension profile of a high efficiency video coding standard when performing the techniques described in this disclosure. In some examples, video encoder 20 may operate in accordance with a screen coding profile of a high efficiency video coding standard when performing the techniques described above.

Figure 3:
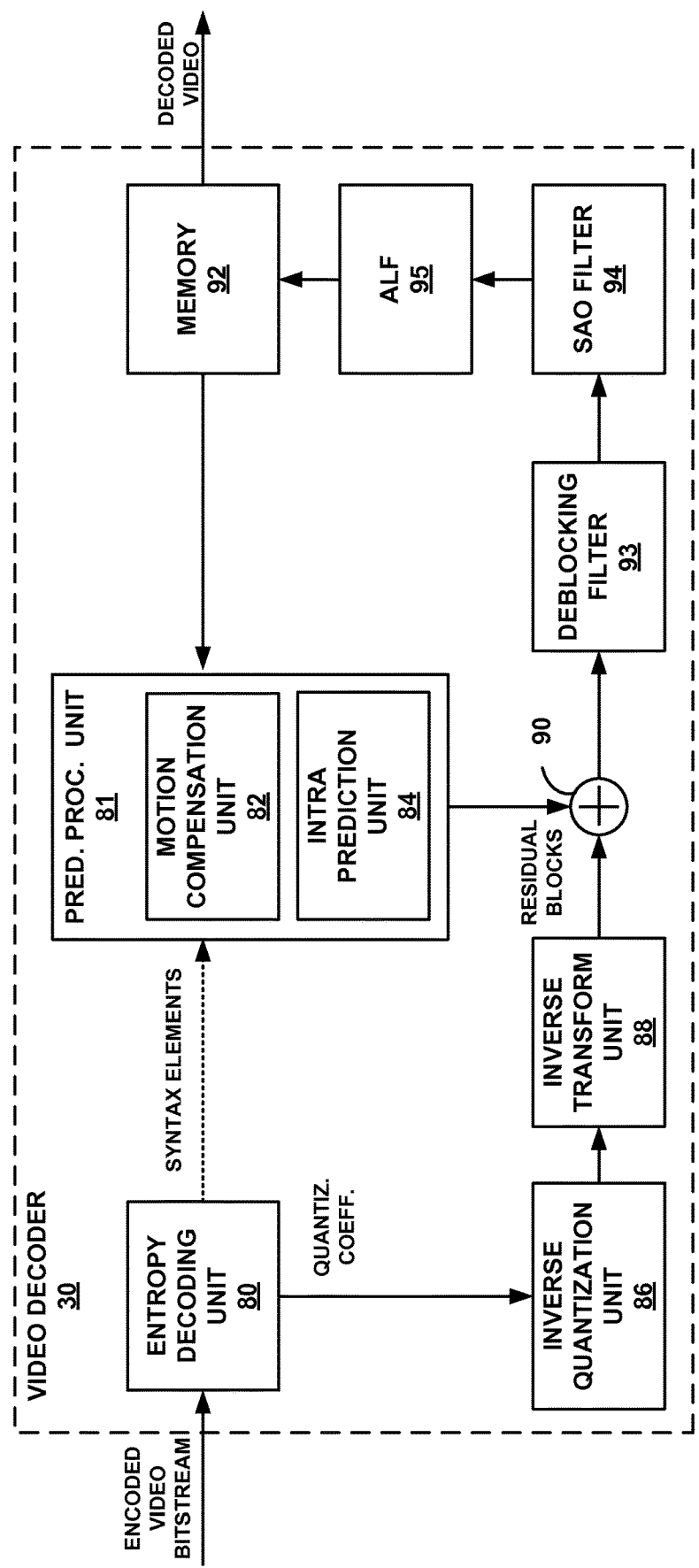
FIG. 3 is an illustrations showing example grouping of bands for band offset classifications for band-based sample adaptive offset filtering.

FIG. 3 is a block diagram illustrating an example video decoder 30 that may implement the SAO techniques described in this disclosure. In the example of FIG. 3, video decoder 30 includes an entropy decoding unit 80, prediction processing unit 81, inverse quantization unit 86, inverse transformation unit 88, summer 90, and reference picture memory 92. Prediction processing unit 81 includes motion compensation unit 82, for inter-prediction decoding, and intra prediction processing unit 84, for intra-prediction decoding. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. The decoded video blocks formed by summer 90 may then be filtered by a deblocking filter 93, SAO filter 94, and adaptive loop filter 95. ALF 95 represents an optional filter that may be excluded from some implementations. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

SAO filter 94 can be configured to apply nearly the same or the same filtering (e.g., edge offset and band offset) as SAO filter 74 discussed above. SAO filter 94 may be configured to determine a first sample adaptive offset (SAO) pixel classification for a block of video data. When determining the first SAO pixel classification for the block of video data, SAO filter 94 may, in some instances, determine the first SAO pixel classification for the block of video data concurrent with at least one of determining a second SAO pixel classification and determining a second offset value.

SAO filter 94 may also determine a first offset value based on the first SAO pixel classification and based on one or more pixel values of the block of video data. When determining the first offset value, SAO filter 94 may, in some instances, determining the first offset value concurrent with at least one of determining the second SAO pixel classification and determining the second offset value.

SAO filter 94 may additionally determine a second SAO pixel classification for the block of video data. In some instances, SAO filter 94 may, when determining the second SAO pixel classification, determine the second SAO pixel classification prior to applying the first offset value to the block of video data.

SAO filter 94 may further determine a second offset value based on the second SAO pixel classification and based on the one or more pixel values of block of video data. When determining the second offset, SAO filter 94 may, in some instances, determine the second offset prior to applying the first offset value to the block of video data. In some instances, SAO filter 94 may, when determining the second SAO pixel classification, determine the second SAO pixel classification prior to determining the first offset. Then, SAO filter 94 may apply the first offset value and the second offset value to the block of video data to generate a block of SAO filtered video data.

Prior to performing SAO filtering, SAO filter 94 may receive syntax elements describing how the SAO filtering was performed by video encoder 20. For example, SAO filter 94 may receive one or more syntax element indicating multi-pass concurrent SAO filtering was performed. In some instances, SAO filter 94 may receive one or more syntax elements indicating multi-pass sequential SAO filtering was performed. In some examples, SAO filter 94 may receive one or more syntax elements indicating that multi-pass SAO filtering was performed, and receive one or more syntax elements indicating that one or more passes of the multi-pass SAO filtering was performed sequentially and one or more passes of the multi-pass SAO filtering was performed concurrently.

As noted above, video encoder 20 may operate in accordance with a range extension profile of a high efficiency video coding standard when performing the techniques described in this disclosure. In some examples, video encoder 20 may operate in accordance with a screen coding profile of a high efficiency video coding standard when performing the techniques described above.

Figure 4:
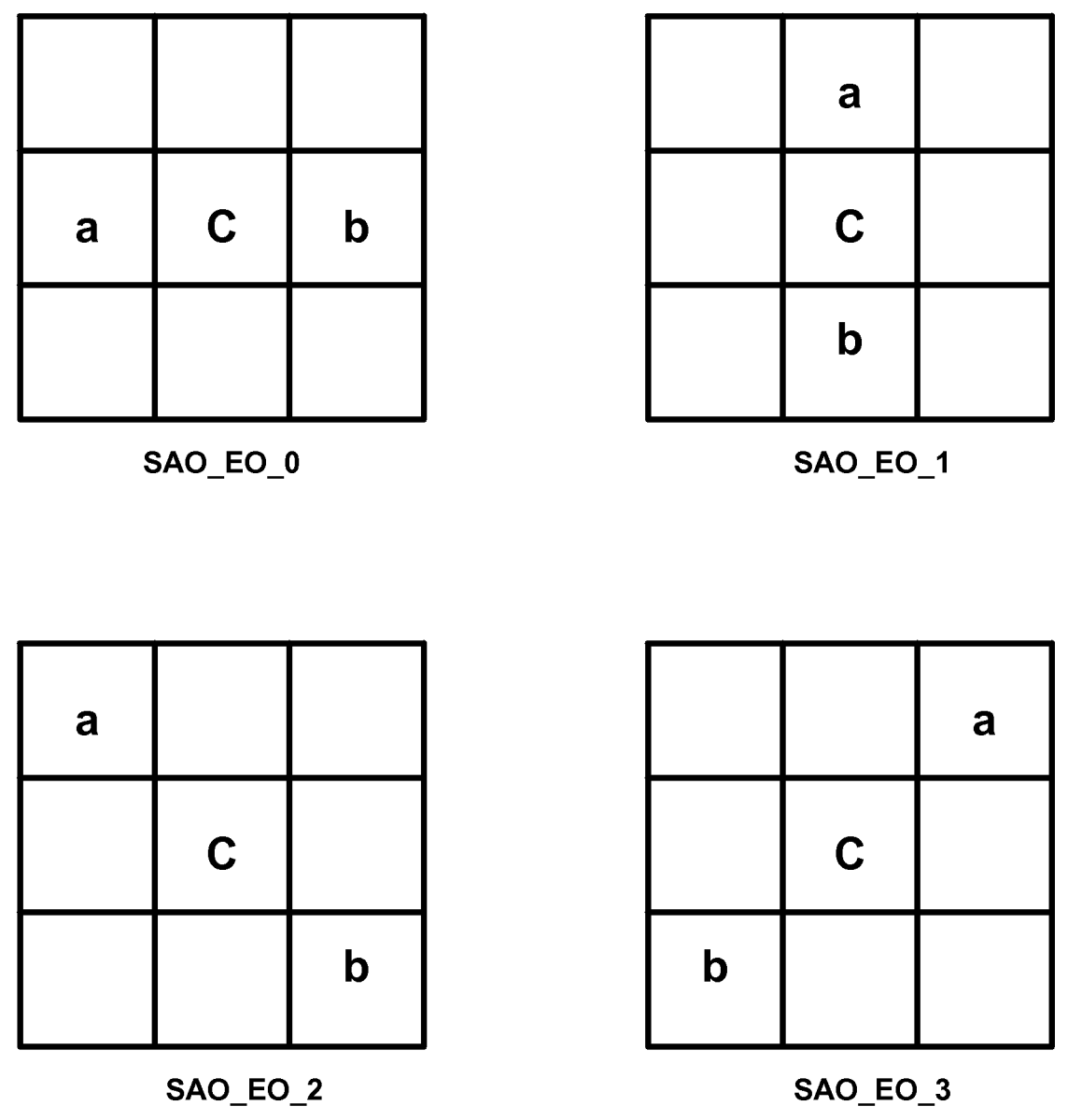

FIG. 4 is a conceptual diagram showing the four possible edge offset classifications used in one implementation of SAO filtering. In the example of FIG. 4, the edge offset type classifies each pixel based on edge information. For each of the edge classifications shown in FIG. 4, an edge type for the current pixel (i.e. a particular pixel being coded) is calculated by comparing the value of the current pixel (C) to the values of neighboring pixels (a and b). For SAO edge offset of classification zero (SAO_EO_0), the current pixel is compared to the left and right neighbor pixels. For SAO edge offset of classification one (SAO_EO_1), the current pixel is compared to the top and bottom neighbor pixels. For SAO edge offset of classification two (SAO_EO_2), the current pixel is compared to the upper left and bottom right neighbor pixels. For SAO edge offset of classification three (SAO_EO_3), the current pixel is compared to the bottom left and upper right neighbor pixels.

Initially, the edge type of the current pixel is assumed to be zero. If the value of current pixel C is equal to values of both the left and right neighbor pixels (a and b), the edge type remains at zero. If the value of the current pixel C is greater than the value of neighbor pixel a, the edge type is increased by one. If the value of the current pixel C is less than the value of neighbor pixel a, the edge type is decreased by one. Likewise, if the value of the current pixel C is less than the value of neighbor pixel b, the edge type is increased by one, and if the value of the current pixel C is less than the value of the neighbor pixel b, the edge type is decreased by 1.

As such, the current pixel C may have an edge type of −2, −1, 0, 1, or 2. The edge type is −2 if the value of current pixel C is less than both values of neighbor pixels a and b. The edge type is −1 if the value of current pixel C is less than one neighbor pixel, but equal to the other neighbor pixel. The edge type is 0 if the value of current pixel C is the same as both neighbor pixels, or if the value of current pixel C is greater than one neighbor pixel, but less than the other neighbor pixel. The edge type is 1 if the value of the current pixel C is greater than one neighbor pixel, but equal to the other neighbor pixel. The edge type is 2 if the value of the current pixel C is greater than both values of neighbor pixels a and b. For each non-zero edge type value, four offset values are determined and signaled in the encoded video bitstream for use by a decoder (i.e., $eoffset_{-2}$, $eoffset_{-1}$, $eoffset_1$, $eoffset_2$).

In view of the above description, for each edge offset classification, edge type values may be computed with the following pseudocode:
EdgeType=0;
if (C>Pixel 1) EdgeType=EdgeType+1;
if (C<Pixel 1) EdgeType=EdgeType−1;
if (C>Pixel 2) EdgeType=EdgeType+1;
if (C<Pixel 2) EdgeType=EdgeType−1

For each edge offset direction, the current pixel (denoted by 'c' in FIG. 2) is classified into one category based on neighboring pixels (denoted by 'a' and 'b') with decoder side derivation as shown in Table 1. Four edge offset values are transmitted for the category 1-4.

TABLE 1

Four edge offset categories with different neighboring pixels

| Category | Condition |
|---|---|
| 1 | c<a && c<b |
| 2 | (c<a && c==b)\|\| (c==a && c<b) |
| 3 | (c>a && c==b)\|\| (c==a && c>b) |
| 4 | c>a && c>b |
| 0 | None of the condition 1-4 |

Figure 5:
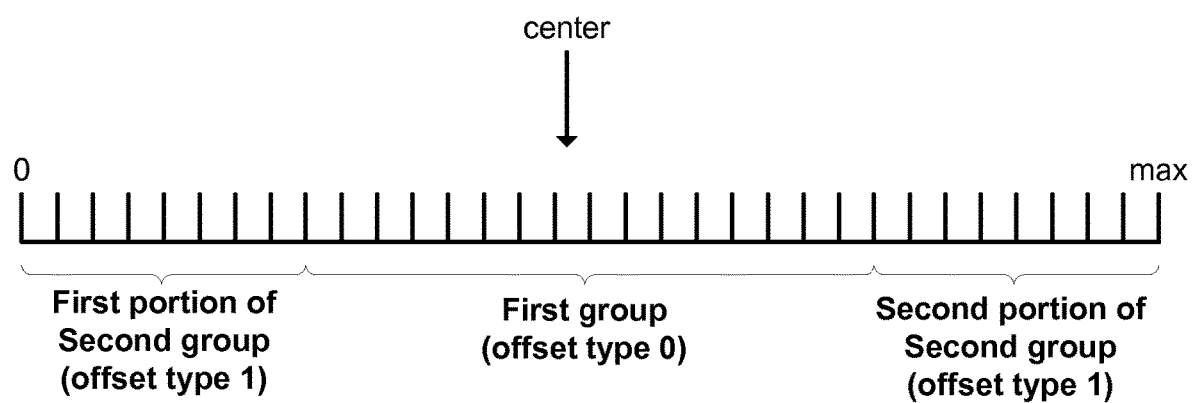
FIG. 5 is a block diagram illustrating an example video decoder that may implement the sample adaptive offset filtering techniques described in this disclosure.

FIG. 5 is a conceptual diagram showing example bands based on intensity values. For purposes of example, assume pixel values range from 0-255, although other ranges may also be used. In such an example, the maximum value shown in FIG. 5 would be equal to 255, and each of the thirty-two bands shown in FIG. 5 would have a range of 8. The left-most band would be pixel values 0-7, the next band would be for pixel values of 8-15, the next band would be for pixel values 16-23, and so on, until the right most band which would be for pixel values 248-255. For band offset, pixels are classified into different bands based on intensity (i.e., for band offset classification, pixels are categorized into one of the thirty-two bands). Based on which band a pixel value falls in, an offset is added to the pixel. For example, if a pixel has a value of 19, then the pixel value falls within the third band which ranges from pixel value 16 to 23. Thus, an offset associated with the third band would be added to the pixel value of 19.

For purposes of signaling the offset values associated with each bands, the bands can be grouped into two or more groups. In some implementations, the sixteen bands in the center (bands 8-23) are classified into one group and the remaining bands (bands 0-7 and 24-31) are classified into a second group. For each group of bands, 16 offset values (i.e., $boffset_0$, ..., $boffset_{15}$) are determined and are signaled in the encoded video bitstream for use by a video decoder. In some implementations, all the offset values for a group, such as the second group, may be assumed to be 0, in which case no signaling of offset values for that group needs to be included in the encoded video bitstream.

As shown in FIG. 5, the middle sixteen bands (bands 8-23) constitute the first group of bands, while the eight left-most bands (band 0-7) constitute the first portion of a second group of bands, and the eight right-most bands (bands 24-31) constitute a second portion of the second group of bands. These groupings of bands constitute one of many possible groupings. For example, in some implementations a first group of bands, such as four bands, may have non-zero offsets, while all remaining bands are assumed to have offsets of zero. Furthermore, in some configurations, the groupings used may be fixed, but in other configurations, the groupings may be adaptive. Thus, which bands have non-zero offsets may adaptively change based on characteristics of the video data being coded.

Figure 6:
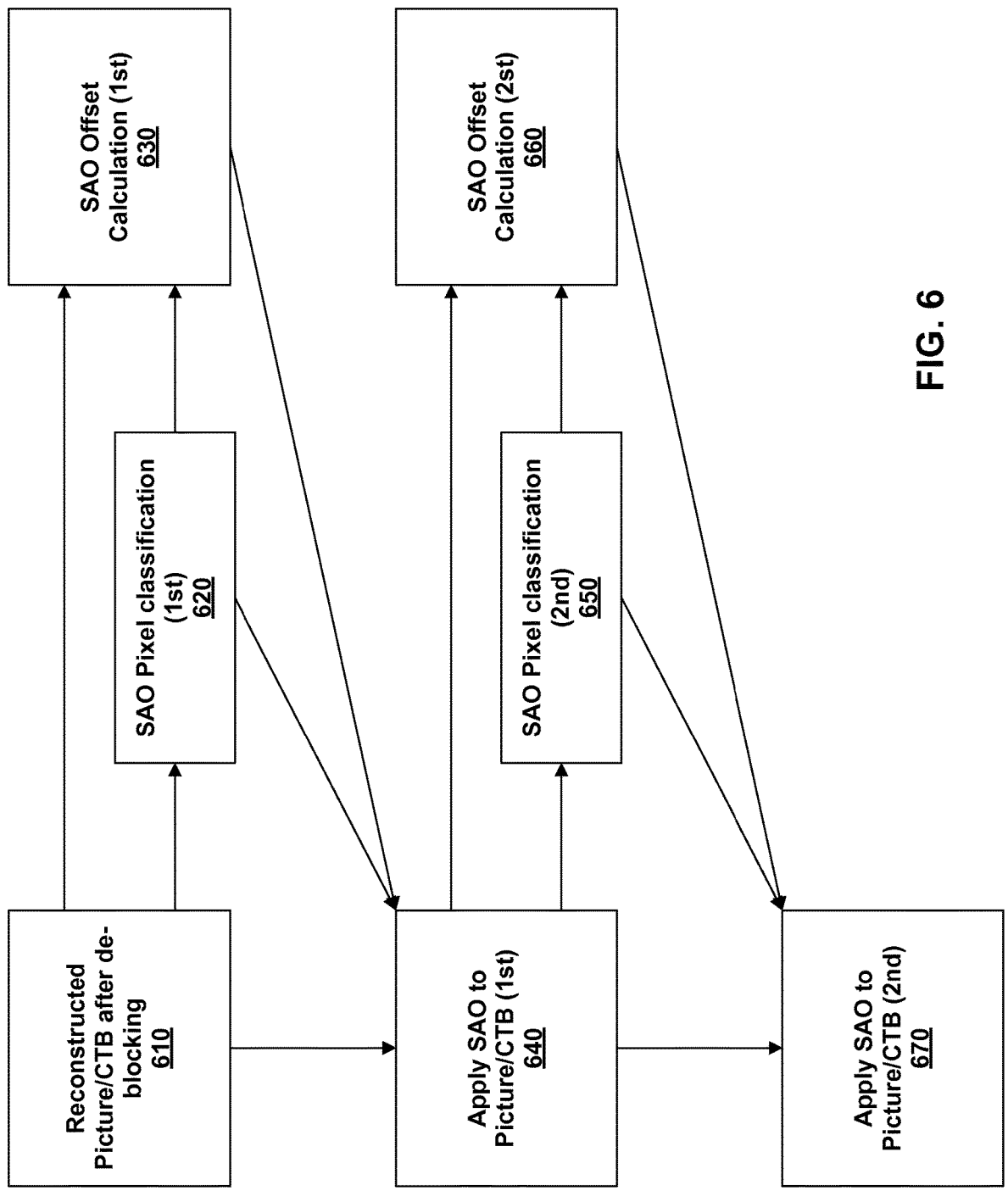
FIG. 6 shows an example of a cascade SAO architecture (both encoder and decoder).

FIG. 6 is a flow diagram showing a two-pass SAO filtering technique in accordance with this disclosure. The techniques of FIG. 6 may be performed by a video decoder such as video decoder 30 or may be performed by a video encoder, such as video encoder 20. The video coder (which again may refer to either or both of video encoder 20 or video decoder 30) generates or receives a reconstructed CTB (610) and determines a first SAO pixel classification for the CTB (620). The reconstructed block may, for example, be a post-deblocked reconstructed block. As described above, the pixel classification may, for example, be based on one of the SAO types discussed above (e.g. EO, BO, or no SAO). Based on the pixel classification, the video coder determines an offset value for the CTB (630) and applies the offset to the CTB (640). The video coder then determines a second pixel classification for the CTB with the first offset (650), and based on the second classification, determines a second offset (660). The video coder then applies the second offset to the CTB with the first offset (670). Thus, the original post-deblocked reconstructed block received at step 610 has two different offsets applied (at step 640 and step 670). The offsets can, for example, be applied on a pixel by pixel basis.

Figure 7:
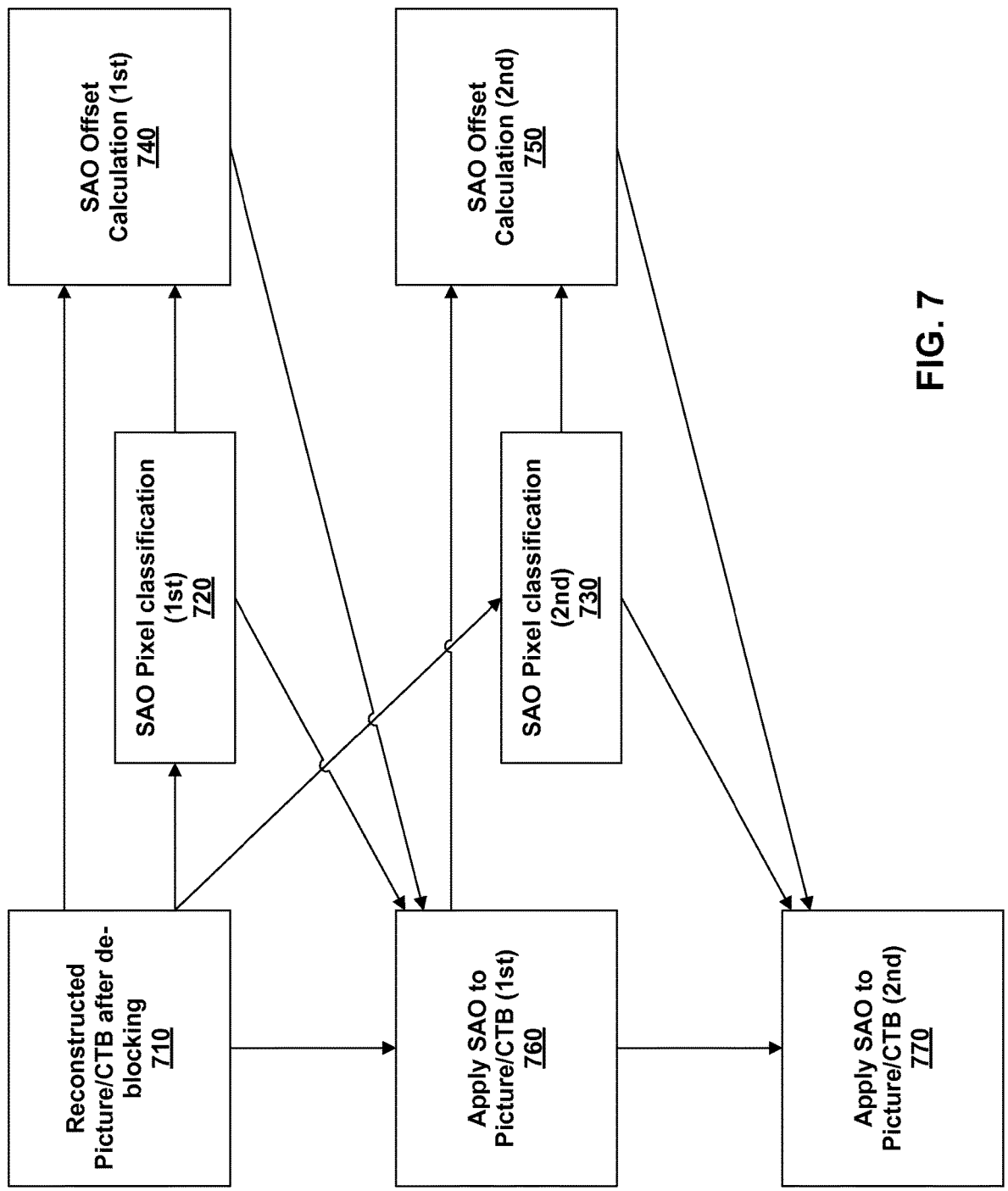
FIG. 7 shows an example of a parallel multiple pass SAO architecture for a video encoder.

FIG. 7 is a flow diagram showing a two-pass SAO filtering technique in accordance with this disclosure. The techniques of FIG. 7 may be performed by a video encoder, such as video encoder 20. The video encoder generates or receives a reconstructed CTB (710). For the reconstructed CTB, the video encoder determines a first SAO pixel classification for the reconstructed CTB (720). The video coder can also determine a second SAO pixel classification for the reconstructed CTB (730). The second SAO pixel classification can be determined based on the original reconstructed CTB (i.e. the reconstructed CTB of 710), as opposed to a reconstructed CTB with a first offset already applied. As the second SAO pixel classification is determined based on the original reconstructed CTB, the video encoder can determine the second SAO pixel classification prior to the first offset being applied to the reconstructed CTB. Thus, in some instances, the video encoder may determine the first offset classification and the second offset classification in parallel or approximately in parallel.

Based on the first pixel classification and the original reconstructed block, the video encoder can determine a first offset value (740) and apply the first offset value to the reconstructed block (760). Based on the reconstructed block with the first offset value and the second pixel classification (i.e. the reconstructed CTB of 760), the video coder can determine a second offset value (750) and apply the second offset value to the reconstructed block with the first offset value (770). Thus, the original post-deblocked reconstructed block received or generated at step 710 has two different offsets applied (at step 760 and 770).

Figure 8:
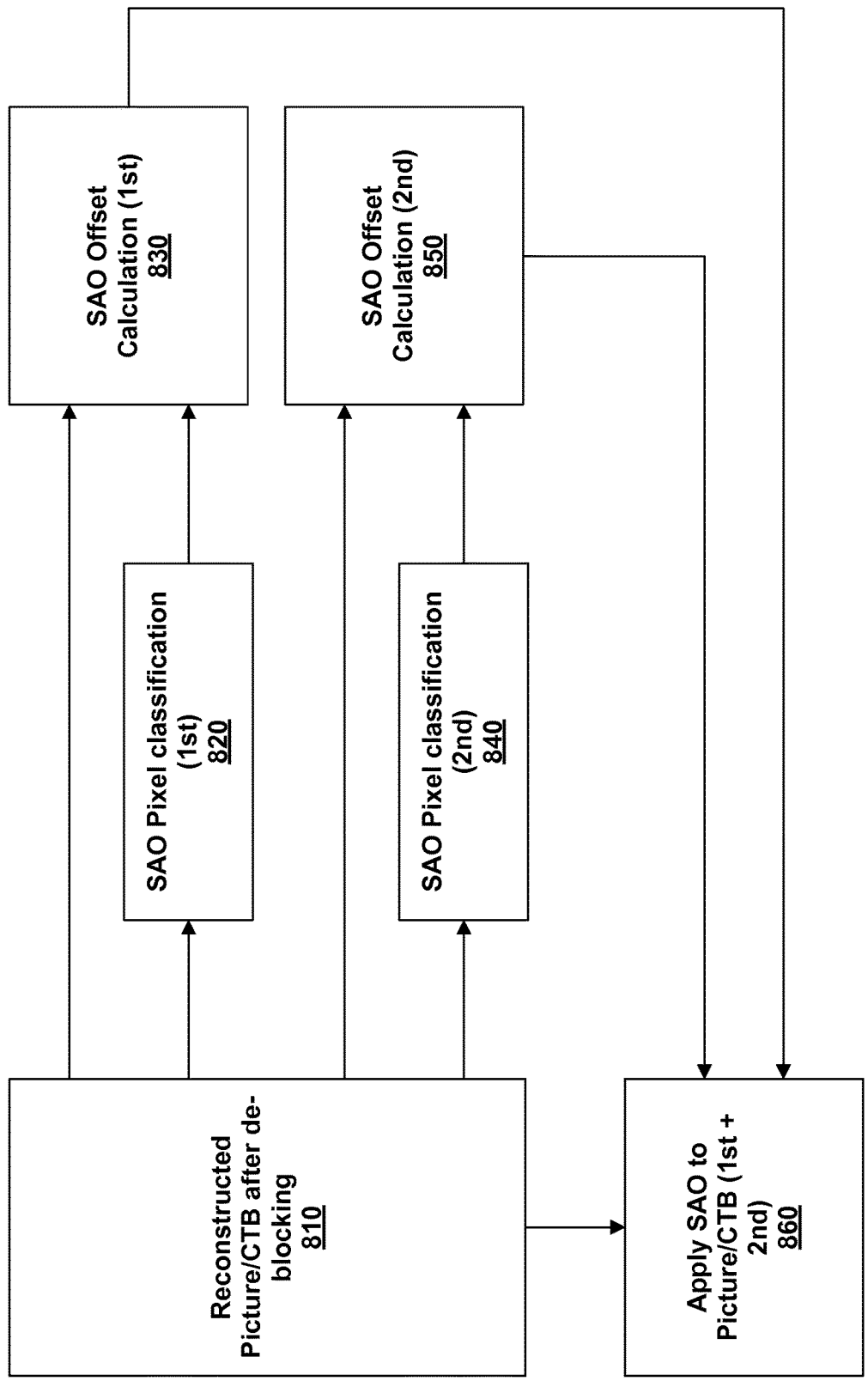
FIG. 8 shows an example of a parallel multiple pass SAO architecture for a video decoder.

FIG. 8 is a flow diagram showing a two-pass SAO filtering technique in accordance with this disclosure. The techniques of FIG. 8 may be performed by a video decoder, such as video decoder 30. The video decoder generates or receives a reconstructed CTB (810). The reconstructed CTB may, for example, be a post-deblocked CTB. The video decoder determines a first SAO pixel classification for the reconstructed CTB (820) and determines a first offset based on the first SAO pixel classification and the reconstructed CTB (830). The video coder also determines a second SAO pixel classification (840) and determines a second offset based on the second SAO pixel classification and the reconstructed CTB (850). The video decoder then applies the first and second offsets to the reconstructed CTB (860). Thus, the original post-deblocked reconstructed block received or generated at step 810 has two different offsets applied (both applied at step 860).

In the example of FIG. 8, as both the first SAO pixel classification and the second SAO pixel classification are determined based on the original reconstructed block, the video decoder can determine the second SAO pixel classification and the second offset value independently of the first SAO pixel classification and first offset. Therefore, the video decoder may determine the second SAO pixel classification and second offset value in parallel with determining the first SAO pixel classification and first offset value.

FIG. 6 shows an example of a cascaded two-pass SAO process, also referred to as a sequential two-pass SAO process. The techniques shown with respect to FIG. 6 generally apply to both a video encoder and decoder. FIG. 7 shows an example of a parallel two-pass SAO encoding process, and FIG. 8 shows an example of a parallel two-pass SAO decoding process. A video encoder, such as video encoder 20, may be configured to perform either the techniques of FIG. 6 or FIG. 7 or may be configured to perform the techniques of both FIG. 6 and FIG. 7. Similarly, a video decoder, such as video decoder 30 may be configured to perform the techniques of either FIG. 6 or FIG. 8 or perform the techniques of both FIG. 6 and FIG. 8. In instances where a video encoder or decoder is configured to perform both sequential and parallel two-pass SAO techniques, e.g., by performing either a sequential or parallel two pass SAO technique on a selective basis, one or more bits in the encoded bitstream may be used to indicate which (i.e. sequential or parallel) SAO technique is to be implemented. Such a bit may be generated by a video encoder and received and parsed by a video decoder.

Although FIGS. 6, 7, and 8 have generally been described with reference to a CTB-level application of SAO, it should be understood that the techniques of FIGS. 6, 7, and 8 can be implemented at a different level, such as a picture level.

Aspects of SAO syntax will now be discussed in more detail. Video encoder 20 represents an example of a video coder configured to generate an encoded bit stream consistent with the syntax discussed below. Video decoder 30 represents an example of a video decoder configured to decode an encoded bitstream and parse syntax consistent with the syntax discussed below.

As introduced above, for each slice, two flags (slice_sao_luma_flag and slice_sao_chroma_flag) are signaled by video encoder 20 in a slice header, and received by video decoder 30, to indicate whether SAO parameters are available for all the LCUs within the slice. When either or both of these two flags are true, a set of SAO parameters is signaled for each LCU within the slice. Table 2 shows detailed syntax for signaling a set of SAO parameters for an LCU. The syntax in Table 2 represents syntax elements generated by encoder 20 and received by decoder 30 to apply SAO parameters in a video decoding process.

TABLE 2

| sao(rx, ry){ | Descriptor |
|---|---|
| if(rx > 0) { | |
|   leftCtbInSliceSeg = CtbAddrInSliceSeg > 0 | |
|   leftCtbInTile = TileId[ CtbAddrInTS ] = = TileId[ CtbAddrRStoTS[ CtbAddrInRS − 1 ] ] | |
|   if(leftCtbInSliceSeg && leftCtbInTile) | |
|     sao_merge_left_flag | ae(v) |
| } | |
| if(ry > 0 && !sao_merge_left_flag) { | |
|   upCtbInSliceSeg = (CtbAddrInRS − PicWidthInCtbsY) >= slice_segment_address | |
|   upCtbInTile = TileId[ CtbAddrInTS ] = = TileId[ CtbAddrRStoTS[ CtbAddrInRS − PicWidthInCtbsY ] ] | |
|   if(upCtbInSliceSeg && upCtbInTile) | |
|     sao_merge_up_flag | ae(v) |
| } | |
| if(!sao_merge_up_flag && !sao_merge_left_flag) { | |
|   for(cIdx = 0; cIdx < 3; cIdx++) { | |
|     if((slice_sao_luma_flag && cIdx = = 0) || (slice_sao_chroma_flag && cIdx > 0)) { | |
|       if(cIdx = = 0) | |
|         sao_type_idx_luma | ae(v) |
|       if(cIdx = = 1) | |
|         sao_type_idx_chroma | ae(v) |
|       if(SaoTypeIdx[ cIdx ][ rx ][ ry ] != 0) { | |
|         for(i = 0; i < 4; i++) | |
|           sao_offset_abs[ cIdx ][ rx][ ry ][ i ] | ae(v) |
|         if(SaoTypeIdx[ cIdx ][ rx ][ ry ] = = 1) { | |
|           for(i = 0; i < 4; i++) | |
|             if(sao_offset_abs[ cIdx ][ rx ][ ry ][ i ] != 0) | |
|               sao_offset_sign[ cIdx ][ rx ][ ry ][ i ] | ae(v) |
|           sao_band_position[ cIdx ][ rx ][ ry ] | ae(v) |
|         } else { | |
|           if(cIdx = = 0) | |
|             sao_eo_class_luma | ae(v) |
|           if(cIdx = = 1) | |
|             sao_eo_class_chroma | ae(v) |
|         } | |
|       } | |
|     } | |
|   } | |
| } | |

Table 3 shows general slice segment header syntax.

TABLE 3

| slice_segment_header( ) { | Descriptor |
|---|---|
| ... | |
|   if(sample_adaptive_offset_enabled_flag) { | |
|     if (layer_id>1) | |
|       if (sao_prediction_vps_enable_flag[ layer_id ]) | |
|         sao_prediction_enable_flag | u(1) |
|     slice_sao_luma_flag | u(1) |
|     slice_sao_chroma_flag | u(1) |
|   } | |
| ... | |
|   if(slice_segment_header_extension_present_flag) { | |
|     slice_segment_header_extension_length | ue(v) |
|     for(i = 0; i < slice_segment_header_extension_length; i++) | |

TABLE 3-continued

| slice_segment_header( ) { | Descriptor |
|---|---|
|     slice_segment_header_extension_data_byte[ i ] | u(8) |
|   } | |
|   byte_alignment( ) | |
| } | |

The syntax element "sao_prediction_enlable_flag" set to 1 indicates that the inter-view prediction of SAO parameters may be enabled for CTUs in the current slice. The syntax element "sao_prediction_enlable_flag" set to 1 indicates that the inter-view prediction of SAO parameters is disabled for any CTU in the current slice. When not present, this flag may be inferred to be equal to the syntax element "sao_prediction_vps_enable_flag[layer_id]," wherein layer_id is the layer identifier of the current slice (NAL unit). In some implementations, the syntax element "sao_prediction_enlable_idc" instead of "sao_prediction_enlable_flag" may be signaled.

The syntax element "sao_prediction_enable_idc" set to 0 indicates that the inter-view prediction of SAO parameters is disabled for any CTU in the current slice. The syntax element "sao_prediction_enable_idc" set to 1 indicates that the inter-view prediction of SAO parameters may be enabled for CTUs in the current slice. The syntax element "sao_prediction_enlable_idc" set to 2 indicates that the inter-view prediction of SAO parameters is always enabled for CTUs in the current slice. In some implementations, this flag may not be signaled and inferred to be equal to the syntax element "sao_prediction_vps_enable_flag[layer_id]."

Table 4 shows an example of coding tree unit syntax.

TABLE 4

| coding_tree_unit(xCtb, yCtb) { | Descriptor |
|---|---|
|   xCtb = (CtbAddrRS % PicWidthInCtbsY) << Log2CtbSizeY | |
|   yCtb = (CtbAddrRS / PicHeightInCtbsY) << Log2CtbSizeY | |
|   CtbAddrInSliceSeg = CtbAddrInRS − slice_segment_address | |
|   if(slice_sao_luma_flag || slice_sao_chroma_flag) | |
|     if (sao_predictoon_enlable_flag) | |
|       sao_merge_base_flag | |
|     else | |
|       sao(xCtb >> Log2CtbSizeY, yCtb >> Log2CtbSizeY) | |
|     coding_quadtree(xCtb, yCtb, Log2CtbSizeY, 0) | |
| } | |

Table 5 shows an example of CTU syntax where the SAO processing in a CTU level can be turned on or turned off based on a flag "sao_process_flag."

TABLE 5

| coding_tree_unit(xCtb, yCtb) { | Descriptor |
|---|---|
|   xCtb = (CtbAddrRS % PicWidthInCtbsY) << Log2CtbSizeY | |
|   yCtb = (CtbAddrRS / PicHeightInCtbsY) << Log2CtbSizeY | |
|   CtbAddrInSliceSeg = CtbAddrInRS − slice_segment_address | |
|   if(slice_sao_luma_flag || slice_sao_chroma_flag) | |
|     if (sao_prediction_enlable_flag) | |
|       sao_merge_base_flag | |

TABLE 5-continued

| coding_tree_unit(xCtb, yCtb) { | Descriptor |
|---|---|
|     else { | |
|       sao_disable_flag | |
|       if(!sao_disable_flag) | |
|         sao(xCtb >> Log2CtbSizeY, yCtb >> Log2CtbSizeY) | |
|     } | |
|   coding_quadtree(xCtb, yCtb, Log2CtbSizeY, 0) | |
| } | |

The syntax element "sao_merge_base_flag" set to 1 specifies that SAO parameters of the corresponding CTUs in the base view are used for the SAO of the current CTU, and the syntax elements "sao_type_idx_luma, sao_type_idx_chroma," "sao_band_position," "sao_eo_class_luma," "sao_eo_class_chroma," "sao_offset_abs" and "sao_offset_sign" are derived from the corresponding syntax elements of the corresponding coding tree blocks of the reference view component. The syntax element "sao_merge_base_flag" set to 0 indicates that SAO parameters of the corresponding CTUs are not used for the SAO of the current CTU and the SAO parameters of the current CTU are explicitly signaled in the SAO syntax table. When not present, the syntax element "sao_merge_base_flag" may be inferred to be equal to 0.

The corresponding CTUs are in the reference view, which may be explicitly signaled or be the first reference view signaled as part of the view dependency in a video parameter set (VPS). In some implementations, however, only one or two components and/or partial SAO parameters can be shared among views.

The syntax element "sao_disable_flag" set to 1 specifies that the SAO parameters are not present for the CTU, and the syntax element "sao_disable_flag" set to 0 specifies that the SAO parameters are present in a SAO syntax table for the CTU.

In some implementations, the corresponding CTU in the view component of the reference view for the current CTU is explicitly signaled for the current CTU.

In some implementations, when multiple corresponding CTUs in the view component of the reference view for the current CTU are identified, the SAO parameter set of the top-left CTU of the corresponding CTUs is used for the current CTU.

In some implementations, when multiple corresponding CTUs in the view component of the reference view for the current CTU are identified, the SAO parameter set of the left CTU of the corresponding CTUs is used for the current CTU.

In some implementations, when multiple corresponding CTUs in the view component of the reference view for the current CTU are identified, the SAO parameter set of one specific CTU of the corresponding CTUs is used for the current CTU.

In some implementations, the merge mode can be signaled in a SAO syntax table as shown in Table 6.

TABLE 6

| sao(rx, ry){ | Descriptor |
|---|---|
|   if(rx > 0) { | |
|     leftCtbInSliceSeg = CtbAddrInSliceSeg > 0 | |
|     leftCtbInTile = TileId[ CtbAddrInTS ] = = TileId[ CtbAddrRStoTS[ CtbAddrInRS − 1 ] ] | |
|     if(leftCtbInSliceSeg && leftCtbInTile) | |

TABLE 6-continued

| sao(rx, ry){ | Descriptor |
|---|---|
|     sao_merge_left_flag | ae(v) |
| } | |
| if(ry > 0 && !sao_merge_left_flag) { | |
|   upCtbInSliceSeg = | |
| (CtbAddrInRS − PicWidthInCtbsY) >= | |
| slice_segment_address | |
|   upCtbInTile = TileId[ CtbAddrInTS ] = = | |
| TileId[ CtbAddrRStoTS[ CtbAddrInRS − | |
| PicWidthInCtbsY ] ] | |
|   if(upCtbInSliceSeg && upCtbInTile) | |
|     sao_merge_up_flag | ae(v) |
| } | |
| if(!sao_merge_left_flag && !sao_merge_up_flag && | |
| sao_prediction_enable_flag) | |
|   sao_merge_base_flag | |
| if(!sao_merge_up_flag && !sao_merge_left_flag &&! | |
| sao_merge_base_flag) { | |
|   for(cIdx = 0; cIdx < 3; cIdx++) { | |
|     ... | |
|   } | |
| } | |

Aspects of an SAO process will now be discussed in more detail. Inputs of this process are the reconstructed picture sample arrays prior to application of SAO, recPicture$_L$, recPicture$_{Cb}$ and recPicture$_{Cr}$, in which L, Cb, and Cr refer to luma, B-Y chroma, and R-Y chroma, respectively. Outputs of this process are the modified reconstructed picture sample arrays after applicatin of SAO, saoPicture$_L$, saoPicture$_{Cb}$ and saoPicture$_{Cr}$. This process is performed on a coding tree block basis or picture basis after the completion of the deblocking filter process for the decoded picture. The following examples generally describe SAO being applied on a CTB basis (also referred to as an LCU basis), although other block sizes may also be used.

The sample values in the modified reconstructed picture sample arrays after application of SAO saoPicture$_L$, saoPicture$_{Cb}$ and saoPicture$_{Cr}$ are initially set equal to the sample values in the reconstructed picture sample arrays prior to application of SAO, recPicture$_L$, recPicture$_{Cb}$ and recPicture$_{Cr}$. The variables, Log 2CtbSizeY, CtbSizeY, PicWidthInCtbsY, and PicHeightInCtbsY are set as follows.

$$\text{Log 2 Min } CbSizeY = \log 2\_\min\_luma\_coding\_block\_size\_minus3+3 \quad (1)$$

$$\text{Log 2}CtbSizeY = \text{Log 2 Min } CbSizeY + \log 2\_diff\_max\_min\_luma\_coding\_block\_size \quad (2)$$

$$CtbSizeY = 1 << \text{Log 2}CtbSizeY \quad (3)$$

$$PicWidthInCtbsY = \text{Ceil}(pic\_width\_in\_luma\_samples \div CtbSizeY) \quad (4)$$

$$PicHeightInCtbsY = \text{Ceil}(pic\_height\_in\_luma\_samples \div CtbSizeY) \quad (5)$$

For every coding tree unit with coding tree block location (rx, ry), where rx=0 . . . PicWidthInCtbsY−1 and ry=0 . . . PicHeightInCtbsY−1, the following applies:

When slice_sao_luma_flag of the current slice is equal to 1, the coding tree block modification process as described above may be invoked with recPicture set equal to recPicture$_L$, cIdx set equal to 0, (rx, ry) and nS set equal to (1<<Log 2CtbSizeY) as inputs and the modified luma picture sample array saoPicture$_L$ as output.

When slice_sao_chroma_flag of the current slice is equal to 1, the coding tree block modification process as described above may be invoked with recPicture set equal to recPicture$_{Cb}$, cIdx set equal to 1, (rx, ry) and nS set equal to (1<<(Log 2CtbSizeY−1)) as inputs and the modified chroma picture sample array saoPicture$_{Cb}$ as output.

When slice_sao_chroma_flag of the current slice is equal to 1, the coding tree block modification process as described above may be invoked with recPicture set equal to recPicture$_{Cr}$, cIdx set equal to 2, (rx, ry) and nS set equal to (1<<(Log 2CtbSizeY−1)) as inputs and the modified chroma picture sample array saoPicture$_{Cr}$ as output.

A coding tree block modification process will now be described. Inputs to this process are:

picture sample array recPicture for the colour component cIdx, a variable cIdx specifying colour component index, a pair of variables (rx, ry) specifying the coding tree block location, a coding tree block size nS.

Output of this process is a modified picture sample array saoPicture for the color component cIdx.

The variable bitDepth is derived as follows.

If cIdx is equal to 0, bitDepth is set equal to BitDepthY.

Otherwise, bitDepth is set equal to BitDepth$_C$.

The variables xC and yC are set equal to rx*nS and ry*nS, respectively.

For i=0 . . . nS−1 and j=0 . . . nS−1, depending on the value of pcm_loop_filter_disable_flag, pcm_flag[xC+i][yC+j], and cu_transquant_bypass_flag of the coding unit which includes the coding block covering recPicture[xC+i][yC+j], the following applies:

If one or more of the following conditions are true, saoPicture[xC+i][yC+j] is not modified.

pcm_loop_filter_disable_flag and pcm_flag[xC+i][yC+j] are both equal to 1.

cu_transquant_bypass_flag is equal to 1.

SaoTypeIdx[cIdx][rx][ry] is equal to 0.

Otherwise, if SaoTypeIdx[cIdx][rx][ry] is equal to 2, i.e., edge offset, the following ordered steps apply:

1. The values of hPos[k] and vPos[k] for k=0 . . . 1 are specified in Table 7 based on SaoEoClass[cIdx][rx][ry].

2. The variable edgeIdx is derived as follows.

If one or more of the following conditions for (xS, xS)=(xC+i+hPos[k], yC+j+vPos[k]), k=0 . . . 1 are true, edgeIdx is set equal to 0.

The sample at location (xS, yS) is outside picture boundary

The sample at location (xS, yS) belongs to a different slice and one of the following two conditions is true:

MinTbAddrZS[xS>>Log 2MinTrafoSize][yS>>Log 2MinTrafoSize] is less than MinTbAddrZS[(xC+i)>>Log 2MinTrafoSize][(yC+j)>>Log 2MinTrafoSize] and slice_loop_filter_across_slices_enabled_flag in the slice which the sample recPicture[xC+i][yC+j] belongs to is equal to 0.

MinTbAddrZS[(xC+i)>>Log 2MinTrafoSize][(yC+j)>>Log 2MinTrafoSize] is less than MinTbAddrZS[xS>>Log 2MinTrafoSize][yS>>Log 2MinTrafoSize] and slice_loop_filter_across_slices_enabled_flag in the slice which the sample recPicture[xS][yS] belongs to is equal to 0.

loop_filter_across_tiles_enabled_flag is equal to 0 and the sample at location (xS, yS) belongs to a different tile.

Otherwise, edgeIdx is derived as follows.

$$\text{edgeIdx} = 2 + \Sigma_k(\text{Sign}(rec\text{Picture}[xC+i][yC+j] - rec\text{Picture}[xC+i+hPos[k]][yC+j+vPos[k]])) \text{ with } k=0\ldots1 \quad (6)$$

When edgeIdx is equal to 0, 1, or 2, it is modified as follows.

$$\text{edgeIdx} = (\text{edgeIdx} == 2)?0:(\text{edgeIdx}+1) \quad (7)$$

3. The modified picture sample array saoPicture[xC+i][yC+j] is derived as follows.

$$sao\text{Picture}[xC+i][yC+j] = \text{Clip3}(0,(1<<\text{bitDepth})-1,$$

$$rec\text{Picture}[xC+i][yC+j] + SaoOffsetVal[cIdx][rx][ry][\text{edgeIdx}]) \quad (8)$$

Otherwise (SaoTypeIdx[cIdx][rx][ry] is equal to 1, i.e., band offset), the following ordered steps apply:
1. The variable bandShift is set equal to bitDepth−5.
2. The variable saoLeftClass is set equal to sao_band_position[cIdx][rx][ry].
3. The list bandTable is defined with 32 elements and all elements are initially set to 0. Then, four of its elements (indicating the starting position of bands for explicit offsets) are modified as follows.
for(k=0; k<4; k++)

$$\text{bandTable}[(k+sao\text{LeftClass})\&31] = k+1 \quad (9)$$

4. The variable bandIdx is set equal to $$\text{bandTable}[rec\text{Picture}[xC+i][yC+j]>>\text{bandShift}] \quad (10)$$

5. The modified picture sample array saoPicture[xC+i][yC+j] is derived as follows.

$$sao\text{Picture}[xC+i][yC+j] = \text{Clip3}(0,(1<<\text{bitDepth})-1,$$

$$rec\text{Picture}[xC+i][yC+j] + SaoOffsetVal[cIdx][rx][ry][\text{bandIdx}]) \quad (11)$$

Table 7 shows an example of specification of hPos and vPos according to the SAO class.

TABLE 7

| | SaoEoClass[cIdx][rx][ry] | | | |
|---|---|---|---|---|
| | 0 | 1 | 2 | 3 |
| hPos[0] | −1 | 0 | −1 | 1 |
| hPos[1] | 1 | 0 | 1 | −1 |
| vPos[0] | 0 | −1 | −1 | −1 |
| vPos[1] | 0 | 1 | 1 | 1 |

An SAO process summary will now be provided. In HEVC, SAO process applies to a coding tree block (CTB) to reduce the encoding delay. When encoding delay is not one of the primary concerns, SAO process can be applied to the whole picture, which can greatly reduce the parameter signaling overhead.

In HEVC, each CTB can only select one type from: band offset, edge offset, and none, i.e., SaoTypeIdx[cIdx][rx][ry]. If SaoTypeIdx[cIdx][rx][ry] equals to 0, SAO process is turned off. If SaoTypeIdx[cIdx][rx][ry] equals to 1, band offset process is enabled, and it can only correct 4 consecutive bands. If SaoTypeIdx[cIdx][rx][ry] equals to 2, edge offset process is enabled, and it can only correct Gibbs fluctuations along one single direction.

The SAO process is applied pixel by pixel. First, for the edge offset case, a pixel is classified into 5 different categories based on the relative pixel values among itself and its two neighbors along the specified edge offset direction (edge offset type). For the band offset case, a pixel is classified using its own value. Then, an offset is applied to the pixel according to the offset value corresponding to the category explicitly signaled in the bitstream.

For one picture, or one CTB in a picture, the texture may have more than one edge direction, or it may have bands other than the consecutive four bands signaled by the SAO parameters or both texture edge direction(s) and bands, which should be corrected.

Therefore, it may be beneficial to use multiple passes of SAO filtering. In the encoder, the general procedure is specified as follows:

1) Reconstructed pictures after de-blocking filter SAO type and offset calculation (first round)
2) Pixel value adjustment based on the SAO type and offset (first round)
3) SAO type and offset calculation using the original picture and the output picture of first round SAO (second round)
4) Pixel value adjustment based on the SAO type and offset (second round)

The decoder performs the substantially similar procedure as follows:

1) Reconstructed pictures after de-blocking filter
2) Pixel classification (first round)
3) Pixel value adjustment based on the signaled SAO type and offset and pixel classification result (first round)
4) Pixel classification based on the output of first round SAO (second round)
5) Pixel value adjustment based on the signaled SAO type and offset and the second round pixel classification result (second round)

An example of these cascaded SAO filtering operations are described below with respect to FIG. 6. A cascade SAO process in a video decoder may have some potential shortcomings. One such potential shortcoming is decoding delay. A video decoder has to sequentially perform the SAO process for different rounds because the current round SAO's input picture is the output picture of the previous SAO round. The current round's SAO pixel classification is based on the adjusted pixel value after the previous round of SAO, so the decoder cannot process multiple rounds of SAO in parallel. Another potential shortcoming is excessive memory access. A video decoder has to access the reconstructed picture memory multiple times, which can be a waste of bandwidth and power.

According to techniques of this disclosure, a parallel SAO process may be implemented. At a video encoder, a procedure as explained below with respect to FIG. 7 can be implemented. The SAO process can be separated into two procedures, i.e., SAO pixel classification and SAO offset calculation. Rather than using the output of a previous round of SAO as an input for the next round's SAO pixel classification, to facilitate parallel decoding, according to techniques of this disclosure, the original input picture (reconstructed picture after de-blocking filter) may be used for the pixel type classification. Therefore, according to the techniques of this disclosure, the video encoder may perform the pixel classification procedure in parallel (e.g., 720 and 730 in FIG. 7). However, to improve the rate-distortion performance, SAO type and offset calculation process may be performed sequentially. Thus, a video encoder may be configured to perform both the sequential process and the parallel process. The sequential process may, for example, be enabled when improved video coding quality is desired, and the parallel process may be enabled when lower complexity coding is desired.

In the proposed parallel multiple pass SAO for a video decoder, as shown in the example of FIG. 8, video decoder 30 can perform multiple rounds of SAO in parallel because the encoder may use the original reconstructed picture after de-blocking as an input for both the first and second pixel classifications (e.g., 820 and 840 in FIG. 8). For each pixel, decoder 30 can derive multiple SAO types in parallel (2 for the example in FIG. 8) using the reconstructed picture after de-blocking filter as an input. Once the SAO types and categories of the pixel are determined, decoder 30 can update the pixel value by only accessing it once. For example, in FIG. 8, decoder 30 can get two SAO types from decoding the bitstream. The two SAO types can be either bandIdx (=1), or edgeIdx (=2), or disabled (=0). Then, decoder 30 can derive the two SAO indexes, i.e., $saoIdx_1$ and $saoIdx_2$, using equations (6)(7)(9)(10) above in parallel. The modified picture sample array saoPicture[xC+i][yC+j] is derived as follows.

$$saoPicture[xC+i][yC+j]=Clip3(0,(1<<bitDepth)-1,$$

$$recPicture[xC+i][yC+j]+SaoOffsetVal[cIdx][rx][ry][saoIdx_1]+SaoOffsetVal[cIdx][rx][ry][saoIdx_2]) \quad (12)$$

In other words, in existing SAO processes of HEVC, only one SAO type is assigned to a CTB or a picture. The pixels belong to the specific SAO type, and the category is adjusted with the signaled offsets. According to techniques of this disclosure, multiple SAO types can be assigned to a CTB or a picture, and the corresponding offset parameters can be signaled. The SAO type classification for each pixel can be done based on the original decoded picture and one pixel can be classified into multiple SAO types. And then the multiple signaled SAO offsets can be used to adjust the pixel value simultaneously.

Aspect of parallel SAO signaling will now be described. The SAO parameters of the proposed method could be signaled in a similar manner as to the existing HEVC method except for the indication of multiple assigned SAO types. As an example, the proposed N round SAO parameters can be indicated by duplicating the existing SAO parameter (including sao_type_idx_luma, sao_type_idx_chroma, sao_band_position, sao_offset_sign, sao_eo_class_luma, sao_eo_class_chroma, et al) by N times. Furthermore, for picture basis, SAO merge is not necessary, so the syntax of picture based parallel SAO may be designed as shown in Table 8 below.

TABLE 8

| parallel_sao(rx, ry) { | Descriptor |
|---|---|
| sao_rounds | ae(v) |
| for(rIdx = 0; rIdx < SaoRounds; rIdx++) | |
|   for(cIdx = 0; cIdx < 3; cIdx++) { | |
|     if(cIdx = = 0) | |
|       sao_type_idx_luma | ae(v) |
|     else if(cIdx = = 1) | |
|       sao_type_idx_chroma | ae(v) |
|     if(SaoTypeIdx[ cIdx ][ rx ][ ry ] != 0) { | |
|       for(i = 0; i < 4; i++) | |
|         sao_offset_abs[ cIdx ][ rx][ ry ][ i ] | ae(v) |
|       if(SaoTypeIdx[ cIdx ][ rx ][ ry ] = = 1) { | |
|         for(i = 0; i < 4; i++) | |
|           if(sao_offset_abs[ cIdx ][ rx ][ ry ][ i ] != 0) | |
|             sao_offset_sign[ cIdx ][ rx ][ ry ][ i ] | ae(v) |
|         sao_band_position[ cIdx ][ rx ][ ry ] | ae(v) |
|       } else { | |
|         if(cIdx = = 0) | |
|           sao_eo_class_luma | ae(v) |
|         if(cIdx = = 1) | |

TABLE 8-continued

| parallel_sao(rx, ry) { | Descriptor |
|---|---|
|           sao_eo_class_chroma | ae(v) |
|       } | |
|     } | |
|   } | |
| } | |

"sao_rounds" may be a pre-defined value or signaled in the bitstream at a sequence, picture, slice, or LCU level. The value of sao_rounds may be shared by luma and chroma components. Alternatively, "separate sao_rounds" values may be used by luma and chroma components.

Additionally, according to this disclosure, picture-based parallel SAO signaling may be implemented. Cascade SAO (e.g. FIG. 6) may, in some instances, improve coding efficiency compared with parallel SAO. To enable this scenario, the syntax can be designed as shown in Table 9 below, where "SaoRounds" is replaced by "sao_rounds_parallel" and "sao_rounds_sequential."

TABLE 9

| parallel_sao(rx, ry) { | Descriptor |
|---|---|
| sao_rounds_parallel | ae(v) |
| sao_rounds_sequential | ae(v) |
| for(rIdx = 0; rIdx < SaoRounds; rIdx++) | |
|   for(cIdx = 0; cIdx < 3; cIdx++) { | |
|     if(cIdx = = 0) | |
|       sao_type_idx_luma | ae(v) |
|     else if(cIdx = = 1) | |
|       sao_type_idx_chroma | ae(v) |
|     if(SaoTypeIdx[ cIdx ][ rx ][ ry ] != 0) { | |
|       for(i = 0; i < 4; i++) | |
|         sao_offset_abs[ cIdx ][ rx][ ry ][ i ] | ae(v) |
|       if(SaoTypeIdx[ cIdx ][ rx ][ ry ] = = 1) { | |
|         for(i = 0; i < 4; i++) | |
|           if(sao_offset_abs[ cIdx ][ rx ][ ry ][ i ] != 0) | |
|             sao_offset_sign[ cIdx ][ rx ][ ry ][ i ] | ae(v) |
|         sao_band_position[ cIdx ][ rx ][ ry ] | ae(v) |
|       } else { | |
|         if(cIdx = = 0) | |
|           sao_eo_class_luma | ae(v) |
|         if(cIdx = = 1) | |
|           sao_eo_class_chroma | ae(v) |
|       } | |
|     } | |
|   } | |
| } | |

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving one or more syntax elements indicating multi-pass sample adaptive offset (SAO) filtering was performed;
determining, responsive to the one or more syntax elements indicating that the multi-pass SAO was performed, a first SAO pixel classification for a block of video data, wherein the first SAO pixel classification indicates that either an edge-based classification or a band-based classification is to be applied entirely with respect to the block of video data at a block-level;
determining a first offset value based on the first SAO pixel classification and based on the plurality of pixel values of the block of video data;
determining, responsive to the one or more syntax elements indicating that the multi-pass SAO was performed, a second SAO pixel classification for the block of video data concurrent to determining the first SAO pixel classification or determining the first offset value, wherein the second SAO pixel classification indicates that either the edge-based classification or the band-based classification is to be applied entirely with respect to the block of video data at the block-level;
determining a second offset value based on the second SAO pixel classification and based on the plurality of pixel values of the block of video data; and
applying the first offset value and the second offset value to the block of video data to generate a block of SAO filtered video data.

2. The method of claim 1, wherein determining the second SAO pixel classification comprises determining the second SAO pixel classification concurrent to determining the first SAO pixel classification and prior to applying the first offset value to the block of video data.

3. The method of claim 1, wherein determining the second offset comprises determining the second offset concurrent to determining the first SAO pixel classification and prior to applying the first offset value to the block of video data.

4. The method of claim 1, wherein determining the second SAO pixel classification comprises determining the second SAO pixel classification concurrent to determining the first SAO pixel classification and prior to determining the first offset.

5. The method of claim 1, wherein a video decoder performs the method and is configured to operate in accordance with a range extension profile of a high efficiency video coding standard when determining the first sample adaptive offset (SAO) pixel classification for the block of video data, determining the first offset value based on the first SAO pixel classification, based on the one or more pixel values of the block of video data, determining the second SAO pixel classification for the block of video data, determining the second offset value based on the second SAO pixel classification and based on the one or more pixel values of block of video data, and applying the first offset value and the second offset value to the block of video data to generate the block of SAO filtered video data.

6. The method of claim 1, wherein a video decoder performs the method and is configured to operate in accordance with a screen coding profile of a high efficiency video coding standard when determining the first sample adaptive offset (SAO) pixel classification for the block of video data, determining the first offset value based on the first SAO pixel classification and based on the one or more pixel values of the block of video data, determining the second SAO pixel classification for the block of video data, determining the second offset value based on the second SAO pixel classification and based on the one or more pixel values of block of video data, and applying the first offset value and the second offset value to the block of video data to generate the block of SAO filtered video data.

7. The method of claim 1, wherein the block of video data comprises one of a block of luma samples or a block of chroma samples.

8. The method of claim 1, wherein receiving the one or more syntax elements comprises receiving one or more syntax element indicating multi-pass concurrent SAO filtering was performed.

9. The method of claim 1, wherein receiving the one or more syntax elements comprises receiving one or more syntax elements indicating multi-pass sequential SAO filtering was performed.

10. The method of claim 1, wherein receiving the one or more syntax elements comprises receiving one or more syntax elements indicating that one or more passes of the multi-pass SAO filtering was performed sequentially and one or more passes of the multi-pass SAO filtering was performed concurrently.

11. A video decoding device comprising:
a memory configured to store data associated with a block of video data; and
one or more processors configured to:
receive one or more syntax elements indicating multi-pass sample adaptive offset (SAO) filtering was performed;
determine, responsive to the one or more syntax elements indicating that the multi-pass SAO was performed, a first SAO pixel classification for the block of video data, wherein the first SAO pixel classification indicates that either an edge-based classification or a band-based classification is to be applied entirely with respect to the block of video data at a block-level;
determine a first offset value based on the first SAO pixel classification and based on the plurality of pixel values of the block of video data;
determine, responsive to the one or more syntax elements indicating that the multi-pass SAO was performed, a second SAO pixel classification for the block of video data concurrent to determining the first SAO pixel classification or determining the first offset value, wherein the second SAO pixel classification indicates that either the edge-based classification or the band-based classification is to be applied entirely with respect to the block of video data at the block-level;
determine a second offset value based on the second SAO pixel classification and based on the plurality of pixel values of the block of video data; and
apply the first offset value and the second offset value to the block of video data to generate a block of SAO filtered video data.

12. A method of encoding video data, the method comprising:
determining a first sample adaptive offset (SAO) pixel classification for a block of video data, wherein the first SAO pixel classification indicates that either an edge-based classification or a band-based classification is to be applied entirely with respect to the block of video data at a block-level;
determining a first offset value based on the first SAO pixel classification and based on a plurality of pixel values of the block of video data;
applying the first offset value to the block of video data to determine a second block of video data;
determining a second SAO pixel classification for the block of video data concurrent to determining the first SAO pixel classification or determining the first offset value, wherein the second SAO pixel classification indicates that either an edge-based classification or a band-based classification is to be applied with respect to the block of video data at the block-level;
determining a second offset value based on the second SAO pixel classification and based on a plurality of pixel values of the second block of video data;
applying the second offset value to the second block of video data to generate a block of SAO filtered video data;
generating one or more syntax elements indicating that multi-pass SAO filtering was performed; and
specifying, in a bitstream, the one or more syntax elements and the block of SAO filtered video data.

13. The method of claim 12, wherein determining the second SAO pixel classification comprises determining the second SAO pixel classification concurrent to determining the first SAO pixel classification and prior to applying the first offset value to the block of video data.

14. The method of claim 12, wherein determining the second offset comprises determining the second offset concurrent to determining the first SAO pixel classification and prior to applying the first offset value to the block of video data.

15. The method of claim 12, wherein determining the second SAO pixel classification comprises determining the second SAO pixel classification concurrent to determining the first SAO pixel classification and prior to determining the first offset.

16. The method of claim 12, wherein the video encoder operates in accordance with a range extension profile of a high efficiency video coding standard when determining the first sample adaptive offset (SAO) pixel classification for the block of video data, determining the first offset value based on the first SAO pixel classification and based on the one or more pixel values of the block of video data, applying the first offset value to the block of video data to determine the second block of video data, determine the second SAO pixel classification for the block of video data, determine the second offset value based on the second SAO pixel classification and based on the one or more pixel values of the second block of video data, and applying the second offset value to the second block of video data to generate the block of SAO filtered video data.

17. The method of claim 12, wherein the video encoder operates in accordance with a screen coding profile of a high efficiency video coding standard when determining the first sample adaptive offset (SAO) pixel classification for the block of video data, determining the first offset value based on the first SAO pixel classification and based on the one or more pixel values of the block of video data, applying the first offset value to the block of video data to determine the second block of video data, determine the second SAO pixel classification for the block of video data, determine the second offset value based on the second SAO pixel classification and based on the one or more pixel values of the second block of video data, and applying the second offset value to the second block of video data to generate the block of SAO filtered video data.

18. The method of claim 12, wherein the block of video data comprises one or more of a block of luma samples or a block of chroma samples.

19. The method of claim 12, wherein generating the one or more syntax elements comprises generating one or more syntax element indicating multi-pass parallel SAO filtering was performed.

20. The method of claim 12, wherein generating the one or more syntax elements comprises generating one or more syntax elements indicating multi-pass sequential SAO filtering was performed.

21. The method of claim 12, wherein generating the one or more syntax elements comprises generating one or more syntax elements indicating that one or more passes of the multi-pass SAO filtering was performed sequentially and one or more passes of the multi-pass SAO filtering was performed concurrently.

22. A video encoding device comprising:
a memory configured to store data associated with a block of video data; and
one or more processors configured to:
determine a first sample adaptive offset (SAO) pixel classification for the block of video data, wherein the first SAO pixel classification indicates that either an edge-based classification or a band-based classification is to be applied entirely with respect to the block of video data at a block-level;
determine a first offset value based on the first SAO pixel classification and based on a plurality of pixel values of the block of video data;
apply the first offset value to the block of video data to determine a second block of video data;
determine a second SAO pixel classification for the block of video data concurrent to determining the first SAO pixel classification or determining the first offset value, wherein the second SAO pixel classification indicates that either an edge-based classification or a band-based classification is to be applied with respect to the block of video data at the block-level;
determine a second offset value based on the second SAO pixel classification and based on a plurality of pixel values of the second block of video data:
apply the second offset value to the second block of video data to generate a block of SAO filtered video data;
generate one or more syntax elements indicating that multi-pass SAO filtering was performed; and
specify, in a bitstream, the one or more syntax elements and the block of SAO filtered video data.

\* \* \* \* \*